(12) United States Patent
Ono et al.

(10) Patent No.: US 12,187,358 B2
(45) Date of Patent: Jan. 7, 2025

(54) WORK MACHINE WITH TOOL STORAGE BELOW DRIVER SEAT

(71) Applicant: Kubota Corporation, Osaka (JP)

(72) Inventors: Kohei Ono, Sakai (JP); Nozomu Akiyama, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/388,984

(22) Filed: Nov. 13, 2023

(65) Prior Publication Data

US 2024/0158025 A1 May 16, 2024

(30) Foreign Application Priority Data

Nov. 14, 2022 (JP) .................................. 2022-181871

(51) Int. Cl.
| | | |
|---|---|---|
| *B60R 11/06* | (2006.01) | |
| *B60K 17/28* | (2006.01) | |
| *B60N 2/10* | (2006.01) | |
| *B60N 2/38* | (2006.01) | |
| *B62D 49/06* | (2006.01) | |
| *B60R 11/00* | (2006.01) | |

(52) U.S. Cl.
CPC .............. *B62D 49/06* (2013.01); *B60K 17/28* (2013.01); *B60N 2/10* (2013.01); *B60N 2/38* (2013.01); *B60R 11/06* (2013.01); *B60R 2011/0012* (2013.01)

(58) Field of Classification Search
CPC ............ B60R 7/043; B60R 11/06; B60N 2/38
See application file for complete search history.

(56) References Cited

U.S. PATENT DOCUMENTS

| | | | | |
|---|---|---|---|---|
| 3,058,771 A | * | 10/1962 | Hill ........................... | B60N 2/38 296/37.15 |
| 5,037,155 A | * | 8/1991 | Holm ....................... | B60N 2/38 296/65.13 |
| 7,673,920 B2 | * | 3/2010 | Nakamura ............ | B60R 13/083 224/274 |
| 2002/0043057 A1 | * | 4/2002 | Shiba ................... | B60K 5/1208 56/1 |
| 2023/0132970 A1 | * | 5/2023 | Hashimoto .............. | B60K 1/04 180/65.6 |

FOREIGN PATENT DOCUMENTS

| | | |
|---|---|---|
| JP | S53161442 U | 12/1978 |
| JP | S5537796 U | 3/1980 |
| JP | S5599943 U | 7/1980 |
| JP | 2019217922 A | 12/2019 |

\* cited by examiner

*Primary Examiner* — James A English
(74) *Attorney, Agent, or Firm* — The Webb Law Firm

(57) ABSTRACT

A work machine includes in its driver section, a driver's seat; and a tool container disposed below the driver's seat and configured to store a tool.

5 Claims, 5 Drawing Sheets

WORK MACHINE WITH TOOL STORAGE BELOW DRIVER SEAT

CROSS-REFERENCE TO RELATED APPLICATION

This application claims priority to Japanese Patent Application No. 2022-181871 filed Nov. 14, 2022, the disclosure of which is hereby incorporated by reference in its entirety.

BACKGROUND OF THE INVENTION

Field of the Invention

The present invention relates to a work machine including a driver's seat in its driver section such as a tractor and a mower.

Description of Related Art

Work machines of the above type involve use of predetermined tools to, for instance, attach and detach an implement to and from the body or maintain the work machine. Such tools may be stored in a dedicated toolbox and managed in a place apart from the work machine. In such cases, a worker needs to carry the toolbox to the work machine for the above work. This is troublesome, and may decrease the work efficiency.

In view of that, a conventional work machine may include a roll-over protective structure (ROPS) frame at a back portion of the driver's seat and a toolbox attached to a vertically intermediate portion of the ROPS frame (see, for example, JP2019-217922 A).

The driver of the above conventional work machine needs to move away from the driver's seat to backward of the body, open the toolbox, and take out a tool to use the tool for work, meaning that tools are not easily accessible to the driver. Further, the toolbox is exposed to the outside, and may suffer from, for example, a decreased durability due to rain water or the like. The above conventional work machine thus leaves room for improvement in this respect as well.

The above circumstances have led to a demand for a work machine capable of storing tools in such a durable manner that ensures efficient use of the tools.

SUMMARY OF THE INVENTION

A work machine according to the present invention includes: a driver section; a driver's seat in the driver section; and a tool container disposed below the driver's seat and configured to store a tool.

The work machine includes a tool container disposed below the driver's seat and configured to store a tool. This allows the driver to leave the driver's seat and readily take out a tool to start work efficiently with no trouble.

The tool container is covered by the driver's seat above and receives no rain water. This prevents the tool container and tools therein from suffering from a decreased durability, and allows the tool container to store tools in a good state over an extended period of time.

The work machine is therefore capable of storing tools in such a durable manner that ensures efficient use of the tools.

The work machine may preferably further include: a seat support frame supporting the driver's seat; and a body frame supporting the seat support frame in such a manner that the seat support frame is swingable about a lateral axis under a front portion of the driver's seat.

With the above configuration, swinging the seat support frame about the lateral axis opens the space under the driver's seat. This exposes the tool container to the outside through the opening, and allows the driver to easily take out a tool from the tool container.

The work machine may preferably further include: a transmission case below the driver's seat; and a power takeoff shaft protruding backward from the transmission case.

The above configuration allows an implement to be so connected to the power takeoff shaft backward of the transmission case as to receive motive power from the power takeoff shaft. This allows the implement to perform work while being driven on motive power from the power takeoff shaft. The implement is detachable after ending its work.

A worker uses a tool to, for instance, attach and detach an implement to and from the body or couple an implement to the power takeoff shaft, which is close to the driver's seat. The worker is able to easily take out a tool for the above work, as the tool container is close to the power takeoff shaft.

The work machine may preferably further include: a body; a travel device supporting the body in such a manner that enables the body to travel; and an electric motor configured to drive the travel device.

With the above configuration, the work machine uses an electric motor to travel. This eliminates the need for components such as a large engine and a fuel tank, and facilitates saving a space under the driver's seat. This in turn allows the tool container to be placed in such a space for its effective use.

The work machine may preferably be further configured such that the tool container is defined by the driver's seat, the body frame, and a support over the body frame.

The work machine may preferably be further configured such that the tool container is below the seat support frame and above the body frame.

The work machine may preferably be further configured such that swinging the seat support frame forward tilts the driver's seat forward and opens the support upward.

DESCRIPTION OF THE INVENTION

Figure 1:
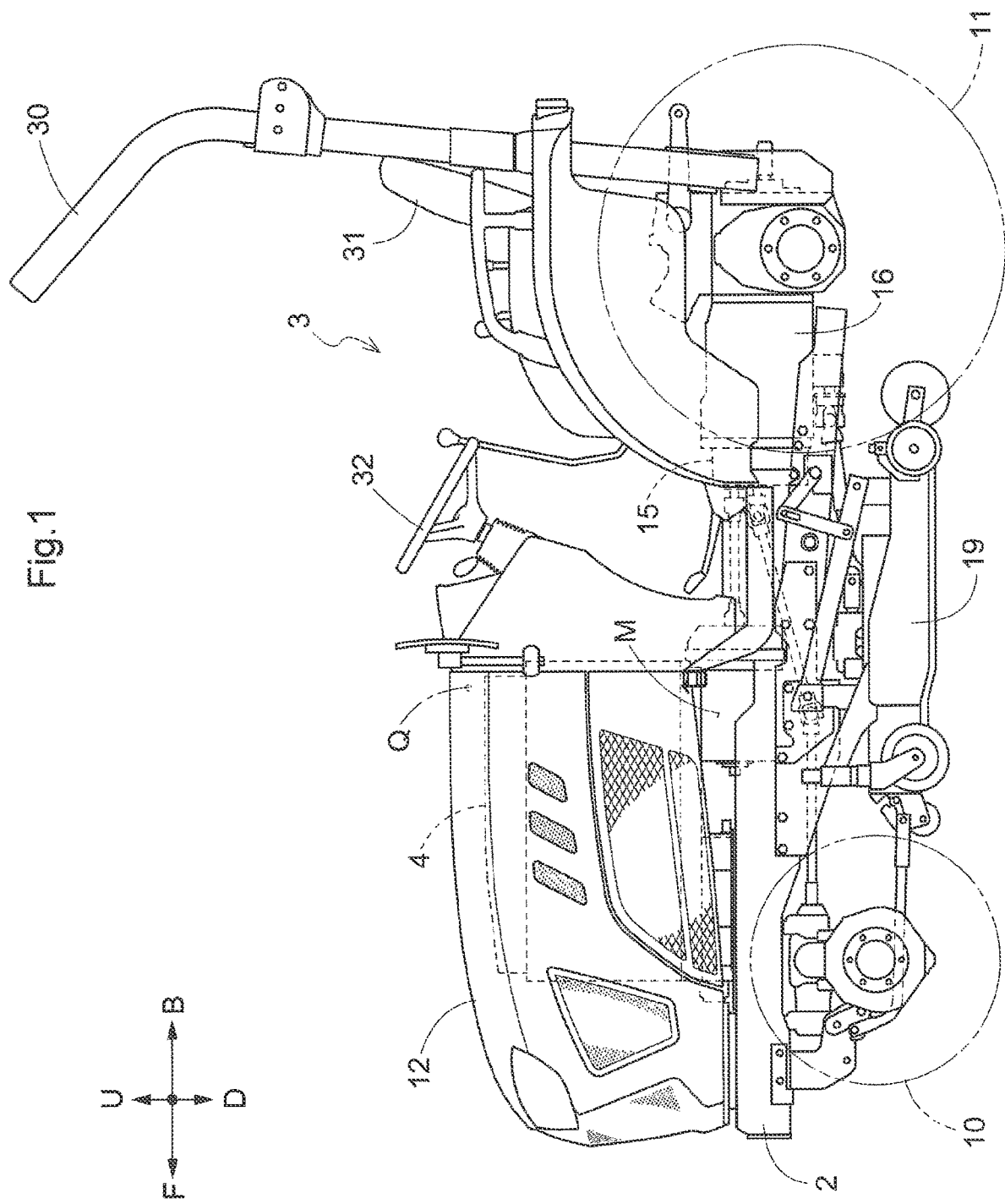
FIG. 1 is a left side view of a tractor.

The description below deals with an embodiment of the present invention with reference to drawings. Unless otherwise specified, the description below uses terms such as "front" and "forward" to refer to the direction indicated with arrow F in the drawings, terms such as "back" and "backward" to refer to the direction indicated with arrow B in the drawings, terms such as "left" and "leftward" to refer to the direction indicated with arrow L in the drawings, terms such as "right" and "rightward" to refer to the direction indicated with arrow R in the drawings, terms such as "above" and "upward" to refer to the direction indicated with arrow U in the drawings, and terms such as "below" and "downward" to refer to the direction indicated with arrow D in the drawings.

Overall Configuration of Tractor

The description below deals with a tractor as an example work machine according to the present invention. As illustrated in FIG. 1, the tractor includes a left and right front wheels 10 and a left and right rear wheels 11 as a travel device 1 and a cover 12 at a front portion of the body.

The tractor includes a body frame 2 and a driver section 3. The body frame 2 is supported by the front and rear wheels 10 and 11.

The driver section 3 is backward of the cover 12. In other words, the cover 12 is forward of the driver section 3.

The driver section 3 includes a protective frame 30, a driver's seat 31, and a steering wheel 32. An operator is able to enter the driver section 3 and sit on the driver's seat 31. The operator operates the steering wheel 32 to change the direction of the front wheels 10. The operator also performs other driving operations in the driver section 3.

The tractor includes a travel battery 4. The cover 12 is swingable about an open/close axis extending laterally relative to the body. The cover 12 is thus capable of being opened and closed. The cover 12, when in the closed state, covers the travel battery 4.

Figure 2:
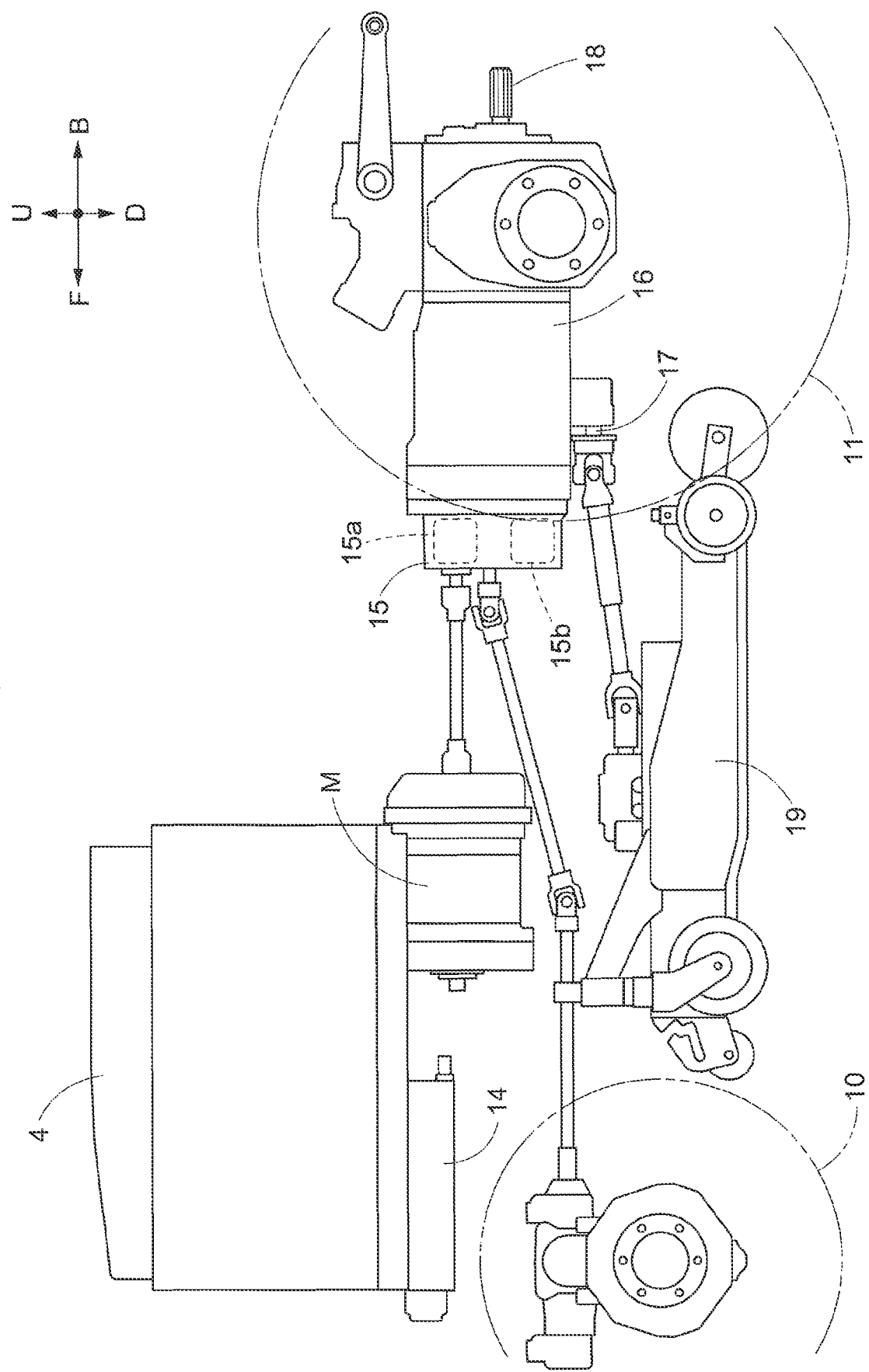
FIG. 2 is a diagram schematically illustrating the respective positions of components of a tractor such as an inverter as viewed from the left.

As illustrated in FIG. 2, the tractor includes an inverter 14 and an electric motor M. The inverter 14 converts direct-current electric power from the travel battery 4 into alternating-current electric power, and supplies the alternating-current electric power to the electric motor M to drive the electric motor M.

Figure 3:
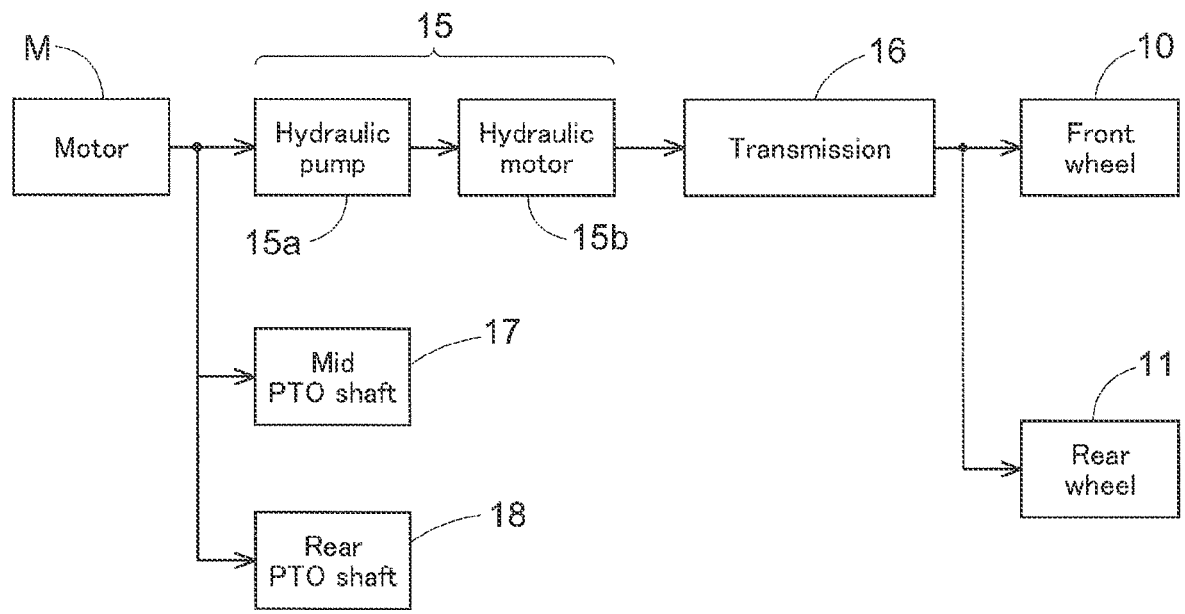
FIG. 3 is a block diagram illustrating how motive power is transmitted.

As illustrated in FIGS. 2 and 3, the tractor includes a hydrostatic, continuously variable transmission 15 and a transmission 16 (which corresponds to the "transmission case"). As illustrated in FIG. 3, the continuously variable transmission 15 includes a hydraulic pump 15a and a hydraulic motor 15b.

The hydraulic pump 15a is drivable on rotation motive power from the electric motor M. The hydraulic motor 15b outputs rotation motive power in response to the hydraulic pump 15a being driven. The continuously variable transmission 15 is configured to vary rotation motive power between the hydraulic pump 15a and the hydraulic motor 15b at a steplessly variable rate.

The hydraulic motor 15b outputs rotation motive power to the transmission 16, which then varies the rotation motive power with use of its gear-type transmission mechanism and distributes the varied rotation motive power to the front and rear wheels 10 and 11 to drive the front and rear wheels 10 and 11.

As illustrated in FIGS. 2 and 3, the tractor includes a mid PTO shaft 17 and a rear PTO shaft 18 (which are each an example of the "power takeoff shaft"). The mid PTO shaft 17 protrudes forward from a lower portion of the transmission 16. The rear PTO shaft 18 protrudes backward from a back portion of the transmission 16. The electric motor M distributes rotation motive power not only to the hydraulic pump 15a, but also to the mid and rear PTO shafts 17 and 18 to rotate the mid and rear PTO shafts 17 and 18.

Connecting an implement to either of the mid and rear PTO shafts 17 and 18 allows the implement to be driven on rotation motive power from the shaft. As illustrated in FIG. 2, the present embodiment includes, as an example, a mower device 19 connected to the mid PTO shaft 17 and drivable on rotation motive power therefrom.

Configuration of Driver Section

Figure 4:
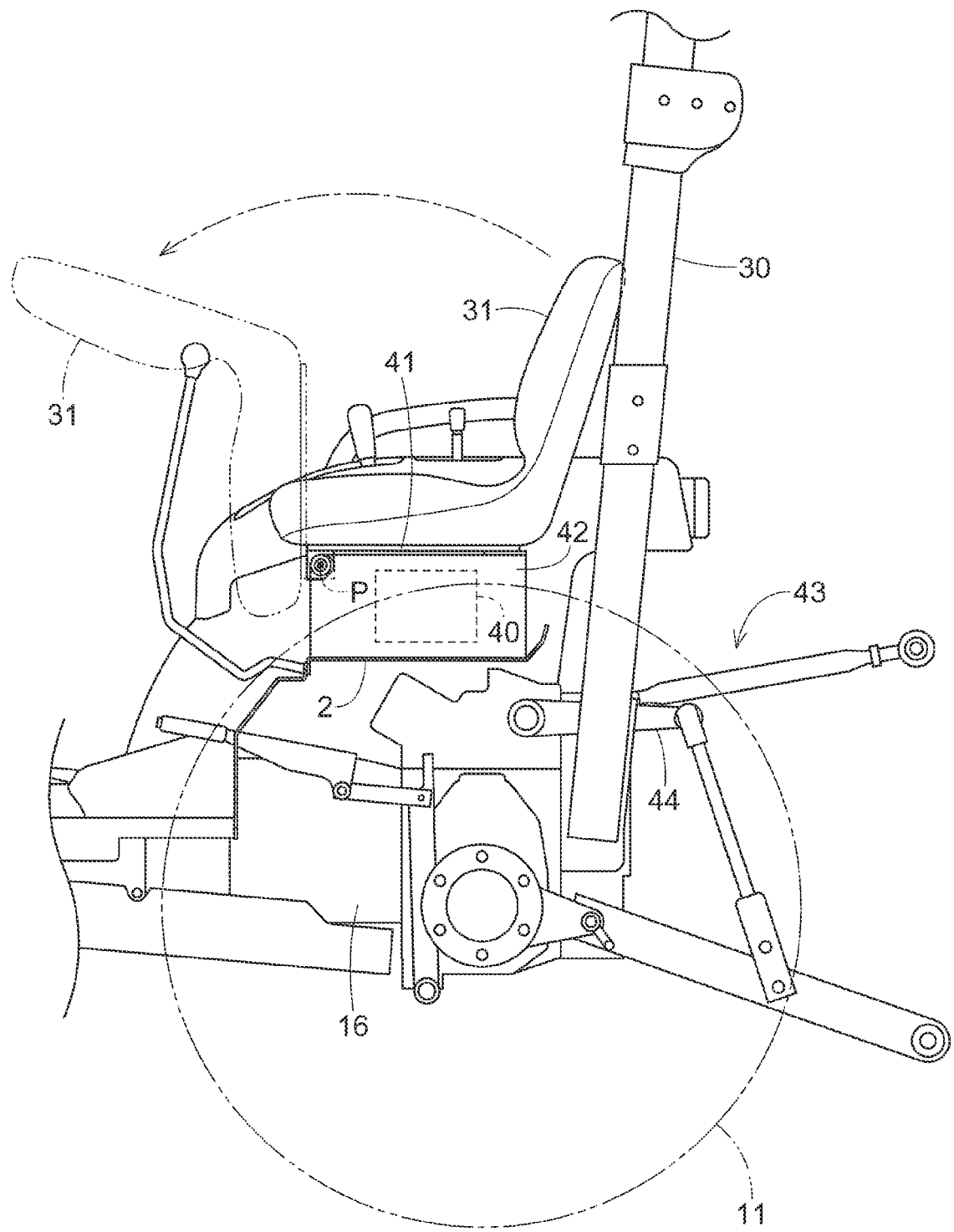
FIG. 4 is a side view of a driver section.
Figure 5:
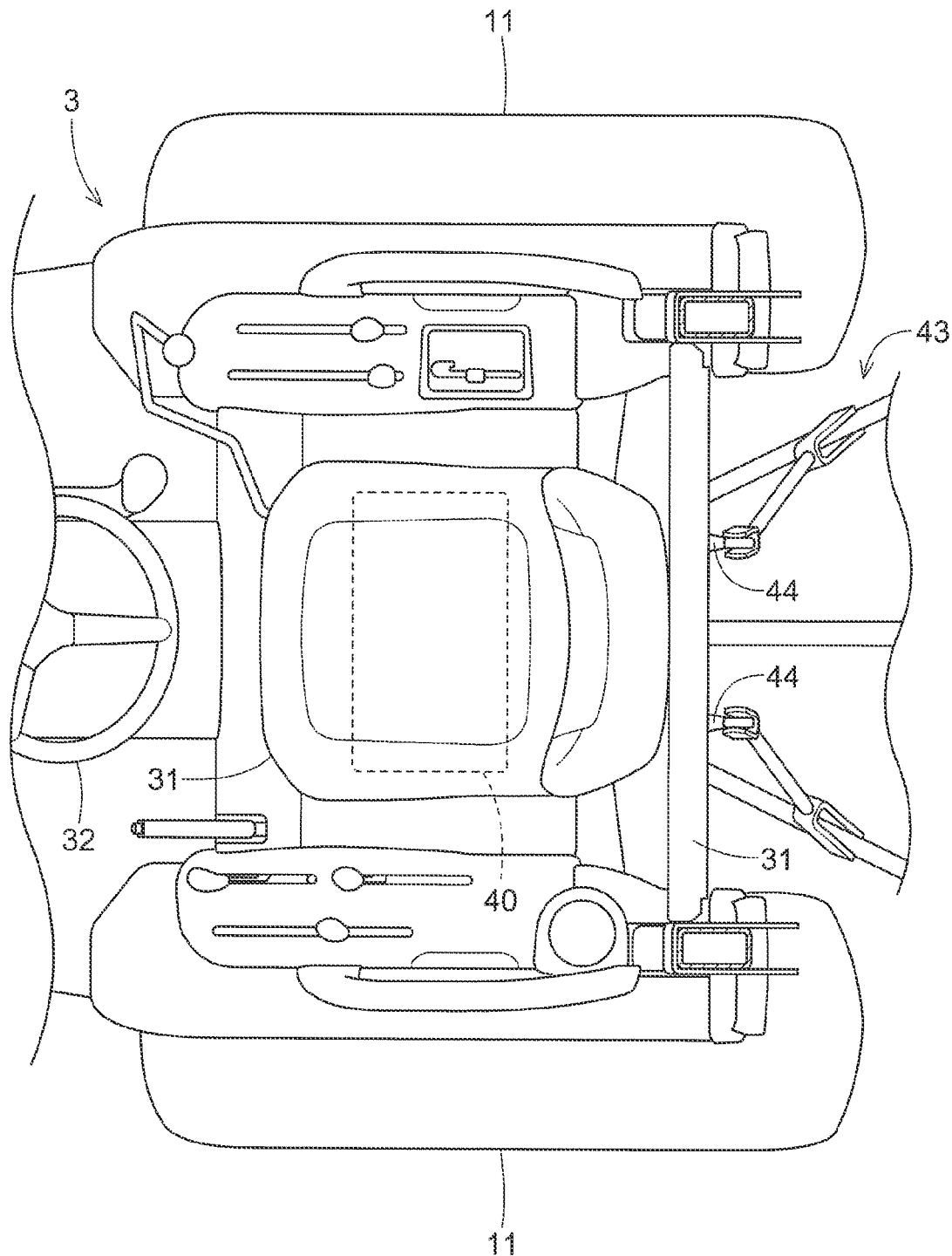
FIG. 5 is a plan view of a driver section.

As illustrated in FIGS. 4 and 5, the driver section 3 includes a tool container 40 disposed under the driver's seat 31 and configured to store tools. The tool container 40 coincides with the driver's seat 31 in a plan view. The driver section 3 includes a seat support frame 41 supporting the driver's seat 31 and supported by the body frame 2 in such a manner as to be swingable about a lateral axis P under a front portion of the driver's seat 31. The tool container 40 is under the seat support frame 41.

The driver section 3 includes a placement section under a back portion of the driver's seat 31 and a support 42 disposed over the body frame 2 and supporting the placement section. Lifting a back portion of the driver's seat 31 swings the driver's seat 31 about the lateral axis P and tilts the driver's seat 31 forward as indicated in FIG. 4 with imaginary lines. The tool container 40 coincides with the support 42 in a side view. The tool container 40 is, in other words, defined by the driver's seat 31, the support 42, and the body frame 2. The tool container 40 is below the seat support frame 41 and above the body frame 2.

Swinging the driver's seat 31 forward opens the space under the driver's seat 31 and exposes the tool container 40 to the outside. The driver is, in this state, able to easily take out a necessary tool. Tilting the driver's seat 31 forward opens the support 42 upward and exposes the tool container 40 to the outside of the support 42.

The tractor may be provided with a rear implement such as a rotary tiller device (not illustrated in the drawings) attached to a back portion of the transmission 16. The driver section 3 includes a three-point link mechanism 43 and a lift arm 44 configured to couple a rear implement to the tractor with the three-point link mechanism 43 in-between in such a manner that the rear implement is capable of being lifted and lowered. The rear implement is configured to receive motive power from the body through the rear PTO shaft 18 and perform work such as tillage work.

Coupling a rear implement requires use of a tool, which may be easily taken out of the tool container 40 after the driver's seat 31 is swung and tilted forward.

ALTERNATIVE EMBODIMENTS (1) The embodiment described above is configured such that the seat support frame 41 is supported by the body frame 2 in such a manner as to be swingable about a lateral axis P. The driver's seat 31 may be supported in any other manner; for instance, the seat support frame 41 may be slidable or detachable.

(2) The embodiment described above includes a rear PTO shaft 18 protruding backward from the transmission 16. The embodiment may alternatively include only the mid PTO shaft 17 or neither of the power takeoff shafts.

(3) The embodiment described above includes an electric motor M configured to drive the travel device 1. The embodiment may alternatively be a work machine including an engine or a hybrid drive source including both an electric motor and an engine.

The present invention is applicable to a work machine including a driver's seat in its driver section such as a tractor and a mower.

The invention claimed is:
1. A work machine, comprising:
 a body comprising a body frame;
 a cover disposed at a front portion of the body;
 a driver section backward of the cover, the driver section comprising:

a driver's seat; and a seat support frame supporting the driver's seat; and a tool container disposed below the driver's seat and configured to store a tool, wherein the body frame extends from under the cover to under the driver's seat, wherein the body frame supports the seat support frame in such a manner that the seat support frame is swingable about a lateral axis under a front portion of the driver's seat, and wherein the tool container is defined by the driver's seat, the body frame, and a support disposed over the body frame.

2. The work machine according to claim 1, further comprising:

a transmission case below the driver's seat; and a power takeoff shaft protruding backward from the transmission case.

3. The work machine according to claim 1, further comprising:

a travel device supporting the body in such a manner that enables the body to travel; and an electric motor configured to drive the travel device.

4. The work machine according to claim 1, wherein:

the tool container is below the seat support frame and above the body frame.

5. The work machine according to claim 1, wherein:

swinging the seat support frame forward tilts the driver's seat forward and opens the support upward.

* * * * *